Dec. 19, 1961  F. HARRIS  3,013,683
JACKS FOR TAG-ALONG TRAILERS
Filed June 25, 1959  2 Sheets-Sheet 1
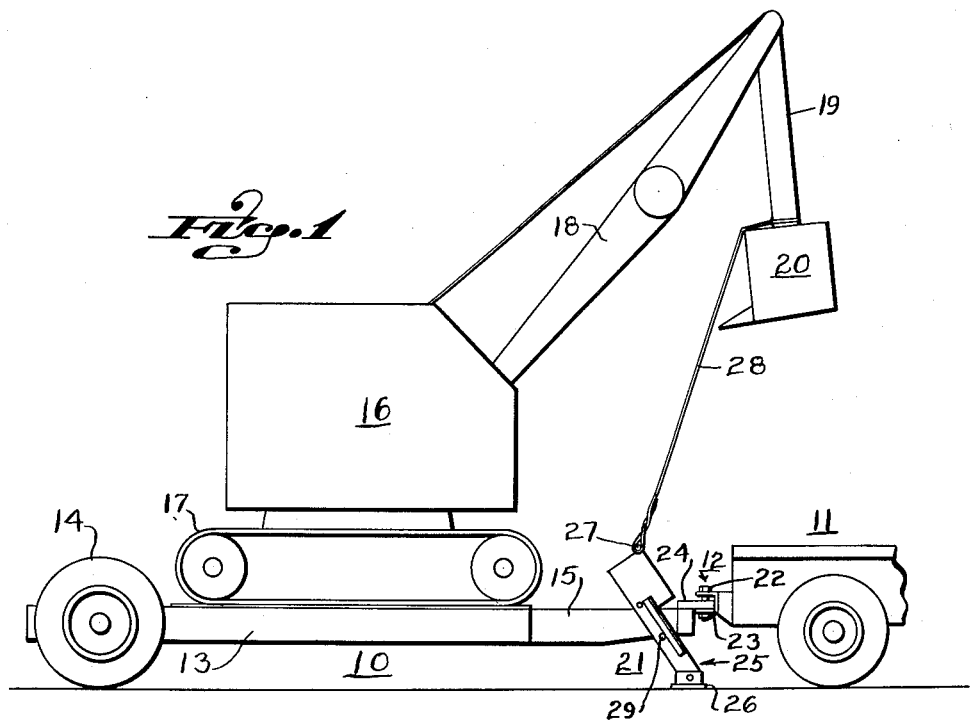
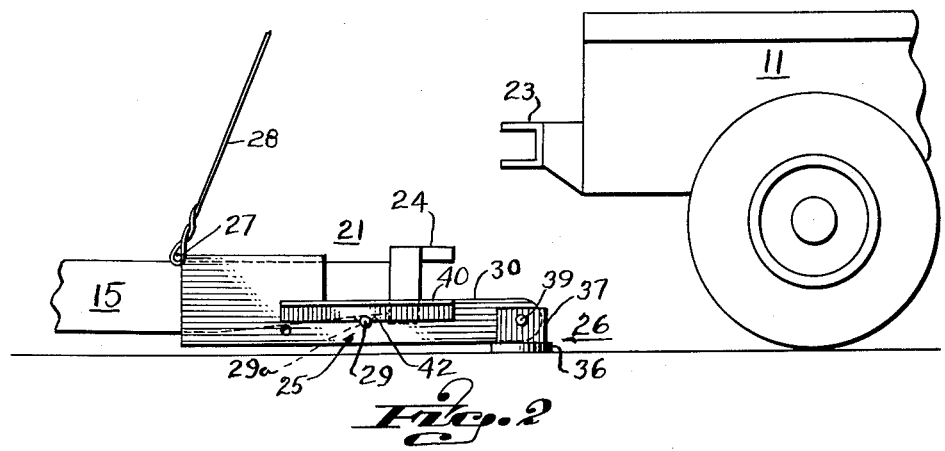
Foster Harris
INVENTOR.
BY Gerald B. Tjoflat
His Attorney Dec. 19, 1961 F. HARRIS 3,013,683
JACKS FOR TAG-ALONG TRAILERS
Filed June 25, 1959 2 Sheets-Sheet 2

Foster Harris
INVENTOR.
BY Gerald B. Tjoflat
His Attorney

United States Patent Office 3,013,683
Patented Dec. 19, 1961

3,013,683
JACKS FOR TAG-ALONG TRAILERS
Foster Harris, 5741 Blue Rock Road, Colerain Township, Hamilton County, Ohio
Filed June 25, 1959, Ser. No. 822,842
7 Claims. (Cl. 214—506)

This invention relates to trailers of the type known as "tag-alongs" that are towed by trucks or tractors, and more particularly to tag-alongs provided with jacks for raising the front ends thereof to hitch height or lowering the same to ground level after having been unhitched.

Tag-along trailers are usually used for transporting construction machinery and the like although that is not their only use. According to this invention, a tag-along is provided with a jack that may be operated by machinery that has been placed thereon to raise or lower the front end of the tag-along to or from hitch height.

The jack comprises a member which is pivoted to the tongue-like member of the tag-along. One end of the jack has a foot or bearing pad for engaging the ground and the other end is provided with means to which a cable may be attached whereby the boom of a machine on the tag-along may lift that end of the jack and rotate it about its pivot. As the jack member pivots, the front end of the tag-along is raised to the height desired, usually hitch height. The jack may be locked in elevated position also, if the tag-along is to be parked with its front end in elevated position. The front end of the tag-along may be lowered by operating the jack in the reverse direction.

The tag-along jack may also be operated as required by the tow truck or tractor, as will appear infra.

The jack may be locked in horizontal position when the tag-along has been hitched to its towing vehicle.

An object of this invention is to provide a tag-along with a jack that is simple in construction and so arranged as to perform the functions above stated.

Other objects of the invention will be apparent to those of ordinary skill in the art to which the invention pertains from the following description taken in conjunction with the accompanying drawings.

In the drawings:

FIGURE 1 is a more or less diagrammatic view of a "tag-along" trailer provided with a jack embodying a form of the invention;

FIG. 2 is an enlarged fragmentary view in side elevation of the tongue-like member of the tag-along, showing the jack in side elevation in the down position;

Figure 3:
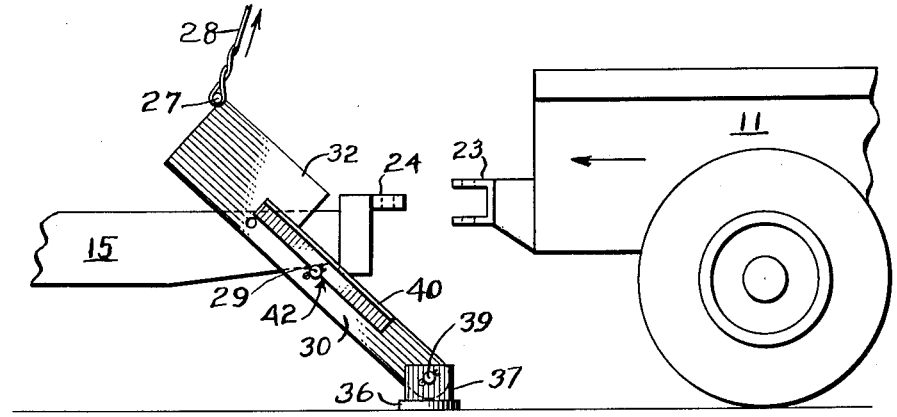
FIG. 3 is an enlarged view in side elevation of the tongue member of the tag-along and the towing vehicle, the jack being shown in the up or hitch position preparatory to hitching.

In the drawings, a trailer 10 of the tag-along type is shown hitched or coupled to a towing vehicle 11 by means of a pin and clevis hitch 12. Other types of hitch may be employed.

Trailer 10 includes a platform 13 supported at its rear on wheels 14 and provided at its forward end with a tongue-like portion 15 that may be coupled to or uncoupled from the towing vehicle 11 by means of the pin and clevis hitch 12.

The platform 12 is designed to carry various types of construction equipment, for example a mechanized shovel 16 having power-driven caterpillar tracks 17. The shovel includes a boom 18 that carries a shovel arm 19 and a shovel 20 of usual construction.

Tag-along trailers are popular because construction equipment may be driven on or off the same while the front end is resting on the ground or in down position.

Figure 4:
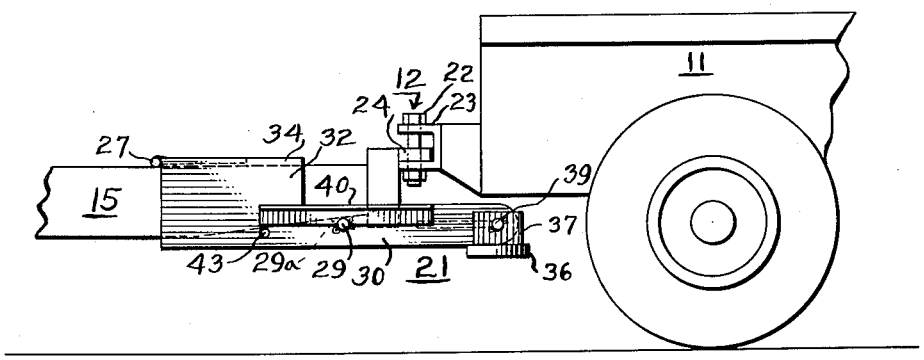
FIG. 4 is a view similar to FIG. 3 showing the tag-along hitched to the vehicle with the jack secured in horizontal or in operative position.
Figure 5:
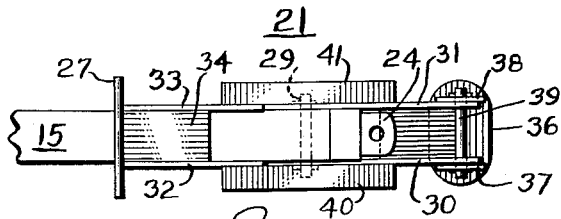
FIG. 5 is a top-plan view of FIG. 2.

The object of this invention is to provide a jack 21 that may be operated by equipment mounted in place on the platform to raise or lower the front end of the same to hitch or up-position or to down-position. FIGS. 1 and 4 show the tag-along in the up and hitched-position; FIGS. 2 and 5 show it in the down-position; while FIG. 3 shows the tag-along in the up-position where it can be hitched by backing the towing vehicle to the position where the clevis pin 22 may be inserted through the clevis 23 and the coupling 24 of the tongue. The jack may also be operated by the towing vehicle as will be apparent in the following description.

The jack 21 is essentially a rotatable stiff leg having at its forward end a foot or bearing 26 and at its rearward end means, such as a crossbar 27, by which the leg may be connected to the shovel by means of a cable or chain 28.

The jack 21 is pivotally supported by the tongue portion 15 on a cross pin 29 journaled in suitable bearings 29a, carried by the portion 15.

The jack 21 may be variously constructed, the form shown being a simple and uncomplicated arrangement. The leg may comprise elongate members 30 and 31 disposed on either side of the tongue portion 15 and which are provided with upwardly projecting flanges 32 and 33, respectively, at the rear portions thereof. The upper edges of these flanges project above the top side of the portion 15 and are connected by a cross plate 34. The flanges and the cross plate thus form an inverted U-section within which the portion 15 is received.

The foot 26 comprises a relatively broad plate 36 having spaced members 37 and 38 extending upwardly therefrom so as to receive the forward ends of the leg members 30 and 31. The foot is pivotally connected to the leg members by a cross pin 39.

The side members 30 and 31 of the leg may also be provided with longitudinally extending angle members 40 and 41 in which bearings 42 are provided for the pivot pin 29.

The jack 21 may be locked in operative or horizontal position by means of a pin 43 inserted through the jack side members 30 and 31 under the tongue portion 15 and to the rear of pivot pin 29 (see FIGS. 2 and 4).

FIGURE 1 illustrates the tag-along trailer as hitched to the towing vehicle and carrying a construction machine on the platform 13. In order to lower the front end of the tag-along so that the construction machine may be run off the platform 13, the rearward end of the jack 21 is connected to the shovel of the machine as shown. The jack locking pin 43 may then be removed so as to allow the jack to assume the position shown in FIG. 1. In that position the shovel arm or boom is raised sufficiently to cause the load at the front end of the tag-along to rest on the foot of the jack. The coupling pin 22 may then be removed, the tow vehicle moved forwardly and the shovel so operated as to cause the jack leg to assume the position shown in FIG. 2. The machine on the tag-along may then be run off the platform 13.

When a machine is to be transported on the tag-along to a construction site, it is run up on the platform 13 as in FIG. 1 and the hoisting cable or bucket, or shovel, as the case may be, connected to the rear end of the jack 21. As the cable is raised, the jack rotates about its pivot pin until the front of the tongue portion 15 is in the position where it can be hitched to the towing vehicle. FIGURE 3 shows the towing vehicle in position to be backed up to the position where the clevis pin 22 can be inserted through the clevis 23 and the coupling portion 24 of the tongue, as in FIG. 4. After the tag-along has been hitched to the towing vehicle, as in FIG. 4, the jack 21 is rotated to a substantially horizontal position and the locking pin 43 is inserted as above stated, thereby holding the jack in the position shown in FIG. 4, while the tag-along is being transported from place to place.

The tag-long jack 21 may also be operated to the various positions above described by connecting a suitable cable, carried by the truck, to the bar 27 at the rearward end of the jack. By driving the truck forward, the jack is rotated to the hitch position. Similarly, by backing the truck, the jack leg may be returned to the down-position for unloading any vehicle on the tag-along platform.

The jack may be locked in the up-position by inserting the lock pin 43 through it so that it crosses to the top of the tongue portion 15. Thus the truck may be backed up and hitched to the tag-along. The jack may be locked in the up-position while the tag-along is parked, if necessary.

Having thus described the invention, it will be apparent to those of ordinary skill in the art to which the invention pertains, that various modifications and changes may be made without departing from either the spirit or the scope of the invention.

Therefore, what is claimed as new and desired to be secured by Letters Patent is:

1. In combination, a tag-along trailer having a load-supporting platform provided with supporting and transport wheels at one end and a hitch tongue portion at the other adapted to be hitched to and unhitched from a towing vehicle, and a jack carried by said tongue portion, said jack comprising a stiff leg straddling said tongue and hinged medially of its ends thereto so that said stiff leg is movable between a horizontal position in which it is generally parallel to said tongue and a generally vertical position relative thereto, said stiff leg having a ground-engaging member at one end, said leg being rotatable by lift means connected to the other end for raising and lowering the tongue end of the platform to or from hitch position said leg being hinged to said tongue portion adjacent the outer end of the tongue portion, the portion of said leg between the medial hinge point thereof and said one end thereof being of greater length than the distance from the hinge point on the tongue portion to the outer end of said tongue portion whereby when said leg is in said horizontal position, said one end of the stiff leg extends beyond the outer end of said tongue portion to permit the tongue portion to be disposed in close adjacency to the ground.

2. A combination as in claim 1 in which the stiff leg is provided with means whereby it may selectively be locked to the tongue portion in substantially vertical or horizontal position.

3. A combination as in claim 2 in which the locking means comprises a pin that may be inserted through the stiff leg and under the tongue portion to lock the leg in horizontal position, or through the leg and on top of the tongue portion to lock the leg in hitch position.

4. A combination as in claim 1 in which the ground-engaging portion of the stiff leg includes a bearing member having means for pivotally connecting the same to the leg.

5. A combination as in claim 1 in which the stiff leg comprises elongate members disposed on each side of the tongue, the upper edges of the rear portions of said members being connected by a cross member extending over said tongue portion, said elongate members and tongue portion having aligned bearings for receiving a hinge pin on which the stiff leg is rotatable, the rear portion of said stiff leg being provided with means for connecting the same to said lift means.

6. A combination as in claim 5 in which the ground-engaging portion of the stiff leg comprises a bearing member having hinge members extending upwardly therefrom in cooperating relation with the adjacent ends of said elongate members and a hinge pin rotatably connecting said hinge members and elongate members.

7. In combination, a tag-along trailer having a load-supporting platform provided with supporting and transport wheels at one end and being provided with a hitch tongue at the other end adapted to be hitched to and unhitched from a towing vehicle, a jack carried by said tongue and adapted to be swung from a horizontal position to a generally vertical position by means of a load lifting vehicle supported on said trailer, said jack including opposite side portions straddling said tongue and being pivotally connected thereto intermediate the ends of said side portions, means rigidly interconnecting said side portions along those edges thereof which are disposed uppermost when the jack is in horizontal position with such means overlying said tongue in close adjacency thereto when the jack is in such position, a ground engaging member pivotally connected to one end of said side portions, and a pin projecting through and removably received in said side portions for disposition both over and under said tongue to lock said jack correspondingly in its respective horizontal and generally vertical positions.

References Cited in the file of this patent
UNITED STATES PATENTS

| 1,285,929 | Cadman | Nov. 26, 1918 |
| 2,788,227 | Wallace | Apr. 9, 1957 |
| 2,885,181 | McCully et al. | May 5, 1959 |

FOREIGN PATENTS

| 578,315 | Great Britain | June 24, 1946 |
| 607,555 | Great Britain | Sept. 1, 1948 |